United States Patent [19]

Hansen

[11] Patent Number: 5,383,962
[45] Date of Patent: * Jan. 24, 1995

[54] CORROSION INHIBITOR

[76] Inventor: Charles N. Hansen, 1448 S. 1700 East, Salt Lake City, Utah 84108-2602

[*] Notice: The portion of the term of this patent subsequent to Jan. 4, 2011 has been disclaimed.

[21] Appl. No.: 137,931

[22] Filed: Oct. 19, 1993

[51] Int. Cl.$^6$ ................................................. C09K 3/18
[52] U.S. Cl. ................................ 106/14.21; 106/14.05
[58] Field of Search ............................ 106/14.21, 14.05

[56] References Cited

U.S. PATENT DOCUMENTS 4,698,173 10/1987 Hansen .................................... 252/70
5,275,752 1/1994 Hansen .................................... 252/70

OTHER PUBLICATIONS

Y. K. Gouda et al, "A Rapid Method of Studying Corrosion Inhibition of Steel in Concrete", Journal of PCA Research & Dev't. Laboratories, Ser. 1175, pp. 24–31 (Sep. 1965).
B. Tremper, "Corrosion of Reinforcing Steel", ASTM Special Technical Pub. No. 169-A, Significance of Test & Properties of Concrete Making Materials, pp. 220–229 (publication date unknown).
John D. Mozer et al, "Corrosion of Reinforcing Bars in Concrete", Journal of the American Concrete Institute, Title No. 62-54, pp. 909–930 (Aug. 1965).
John G. Hendrickson, "Corrosion of Steel in Concrete", Portland Cement Association (Jun. 1968).
"Effect of Various Substances on Concrete and Protective Treatments, Where Required", Portland Cement Association General Information (Dec. 1968).
S. Dressman et al, "Screening Test for Rebar Corrosion Inhibitors", Transportation Research Board, Record No. 1304, pp. 135–139 (1991) (Abstract only).
J. Dillard et al, "Surface Characterization of Reinforcing Steel and the Interaction of Steel with Inhibitors in Pore Solution", Transportation Research Board, Record No. 1304, pp. 122–128 (1991) (Abstract only).
F. Tomosawa et al, "Experimental Study on the Effectiveness of Corrosion Inhibitor in Reinforced Concrete. Admixtures for Concrete: Improvement of Properties" Chapman & Hall, London, England pp. 382–391 (1990) (Abstract only).
R. Buchholz, "Effects of Lignosulfonates in Deicing Salts on the Penetration of Chloride Ions into Concrete", Transportation Research Board Record No. 1268, pp. 186–192 (1990) (Abstract only).
M. Callahan, "Deicing Salt Corrosion with and without Inhibitors", Transportation Research Board Record No. 1211, pp. 12–17 (1989) (Abstract only).
G. Jayaprakash et al, "Electro–Osmotic Techniques for Removal of Chloride from Concrete Sealants", Kansas Dept. of Transportation, Report No. FHWA-KS-32-2 (Aug. 1982) (Abstract only).

*Primary Examiner*—Sam Silverberg
*Attorney, Agent, or Firm*—Dowell & Dowell

[57] ABSTRACT

Compositions of ammonium carbonate and ammonium bicarbonate that are suitable to apply to ferrous materials to inhibit corrosion by chlorides are disclosed.

9 Claims, No Drawings

CORROSION INHIBITOR

BACKGROUND OF THE INVENTION

The invention relates to corrosion inhibitors, and, more particularly, to compositions of ammonium carbonate and ammonium bicarbonate that are suitable to inhibit the corrosion of ferrous materials exposed to chlorides.

There has been a tremendous demand for a chemical which will inhibit the corrosion of steel by chlorides such as sodium chloride, and much research has been conducted in an attempt to discover such a chemical.

Steel is commonly exposed to chloride ions in unavoidable open and enclosed environments. Structures containing steel are exposed to salt water environments in and around oceans or other bodies of salt water and are seriously corroded by chlorides present in the water. In an enclosed environment, calcium chloride is added to concrete to accelerate its rate of setting. These chloride additions have, however, caused the reinforcing steel in the concrete to corrode.

Another significant source of chloride corrosion has been deicing compositions applied to the paved surfaces of roads and highways. These compositions have been splashed onto the steel contained in the highway structures as well as onto metal vehicle bodies. The corrosion thus produced has been quite visible in the form of corroded structures and vehicle bodies. Another well-known and highly visible chloride-related damage to highways has been potholes. Potholes form as the corrosion deposits caused by the action of the chlorides on the reinforcing steel expand and create various stresses on the concrete which subsequently causes large pieces of concrete to fracture and separate from the roads and highways.

Exemplary illustrations of the tremendous amount of research which has been performed in an effort to learn how to inhibit the corrosion of steel and protect it from the effects of chlorides, are found in the following publications: Mozer, Bianchini and Kesler, "Corrosion of Reinforcing bars In Concrete," Journal of the American Concrete Institute, August 1965; "Concrete Information" by the Portland Cement Association (1968); John G. Hendrickson, "Corrosion of Steel in Concrete," Portland Cement Association (1968); and Bailey Tremper, "Corrosion of Reinforcing Steel," American Concrete Institute. These publications in turn list dozens of additional publications focusing on the same subject.

Numerous attempts have been made to identify specific corrosion inhibitors capable of preventing the corrosion of steel. Inhibitors are chemical substances which effectively decrease the corrosion rate in an environment. The corrosion rate may be reduced by such a large extent by inhibitors that the corrosion reaction is effectively stopped in some instances. For example, Gouda and Monfore describe in their publication entitled, "A Rapid Method for Studying Corrosion Inhibition of Steel in Concrete," the testing of some of the well known corrosion inhibitors, such as sodium nitrite, potassium chromate and sodium benzoate. The authors found that to inhibit the corrosion of a 2% addition of calcium chloride to concrete, additions of 1%–2% of sodium nitrite and 2%–4% of potassium chromate were needed. Because sodium benzoate is precipitated by calcium chloride, the authors tested sodium benzoate against 1.6% of sodium chloride and determined that it requires 4%–6% of sodium benzoate to inhibit corrosion in the presence of this amount of sodium chloride.

Because of their undesirable side effects, however, most corrosion inhibitors must be carefully administered. For example, the chromates and other effective chromate salts are highly toxic and will produce ulcers on any skin they contact. As a further example, the publication entitled "Effect of Various Substances on Concrete and Protective Treatments, Where Required", Portland Cement Association (1968), explains that sodium nitrite causes slow disintegration of concrete. To date, a satisfactory corrosion inhibitor for chlorides has not been found.

The above-described inhibitors are anodic inhibitors. According to Gouda and Monfore, the inhibitors can form "sparingly soluble iron salts or gamma $Fe_2O_3$ films on the anodic areas, thus preventing ferrous ion from passing through into solution." These salts form according to the classical understanding that the corrosion of steel is an electrochemical process. At the steel anode, iron goes into solution and forms a ferrous ion and releases two electrons: $Fe \rightarrow Fe^{++} + 2e^-$. At the steel cathode, the two electrons produced at the anode react with two hydrogen ions to form a hydrogen film: $2H^+ + 2e^- \rightarrow H_2$. In instances when the supply of oxygen is limited and the pH is relatively high, an anodic film forms on the steel and prevents further corrosion. When chloride ions are present, however, the protective anodic films are removed by forming soluble chloride compounds and the steel is exposed to further electrochemical attack by the chlorides.

To comprehend the severity of the problem of corrosion, in 1976 the Environmental Protection Agency estimated that using sodium chloride or calcium chloride as deicing compounds costs the U.S. about five billion dollars per year. Probably a significant percentage of this amount can be attributed to the corrosion of steel. Despite the damage salt has produced, it has proven to be a good deicing chemical and has undoubtedly saved thousands of lives and injuries, which would otherwise have resulted from ice-covered roads.

Although salt has been successful for the purpose of deicing roads and highways, it has caused the corrosion of many thousands of highway structures. Consequently, a large amount of money will continue to be needed to repair or replace these damaged structures until a suitable corrosion inhibitor is available for large-scale application.

Thus, there has been an urgent need for a composition which can be applied directly to steel or to structures containing steel so as to inhibit the corrosion already started by deicing chemicals containing chlorides. Such a composition would have the potential to save billions of dollars which would otherwise be spent to rebuild the presently corroding highway structures. Once this corrosion is arrested, the saved repair money can be used to purchase improved deicers having the desirable deicing qualities of salt but lacking its damaging corrosive side effects.

SUMMARY OF THE INVENTION

The present invention has been made in view of the above-described inadequacies of the related art and has as an object to provide a composition which is suitable for applying to metals exposed to chloride environments so as to inhibit their corrosion.

Additional objects and advantages of the present invention will become apparent from the detailed description which follows. To achieve the objects of the invention, as embodied and broadly described herein, the composition of the present invention comprises ammonium carbonate or ammonium bicarbonate in an amount effective to inhibit the corrosion of a metal by a corrosive agent.

DETAILED DESCRIPTION OF THE PREFERRED EMBODIMENT

The present invention is directed to compositions that are capable of reducing the need and thus the cost of highway repair by stopping the ongoing corrosion in highway structures which chloride compounds have initiated. The use of such compositions would eliminate the necessity of spending billions of dollars to mechanically remove the corroded steel from these structures and replace it with more expensive epoxy coated type steel.

The test work in support of the present invention demonstrates that when corroding steel is exposed to ammonium carbonate or ammonium bicarbonate, continued corrosion is inhibited even in the presence of sodium chloride.

Moreover, ammonium carbonate and ammonium bicarbonate are commercially available and relatively small expense will be needed to demonstrate on a large scale how compositions of these chemicals can be used to prevent or stop further corrosion of highway structures.

To demonstrate the effectiveness of ammonium carbonate and ammonium bicarbonate with respect to inhibiting the corrosion of metal which chlorides have initiated, two series of tests were conducted, namely the F13 and G6 series. The F13 Series and a portion of the G6 Series were run in duplicate to determine how additions of ammonium carbonate alone or in the presence of various percentages of sodium chloride inhibit the chloride corrosion of mild steel. The remaining portion of the G6 series of tests was conducted to demonstrate how the addition of ammonium bicarbonate alone or in the presence of various percentages of sodium chloride inhibit the corrosion of mild steel.

The following working examples are provided to illustrate some of the advantages of the present invention and are not in any manner limitative of its scope. All of the following parts and percentages are by weight.

EXAMPLE 1

Tests were conducted by preparing one inch square pieces of 16 gage mild steel. The pieces were prepared for testing by removing mill scale deposits with an inhibited muriatic acid solution and rounding their corners and sides with a fine emery wheel. Each test piece was then marked for identification purposes. Both sides of the test piece were then polished with fine emery paper to a bright surface finish. Dust was removed from the test pieces with a paper towel and their surfaces were then washed with a 1—1—1— trichloroethane solvent. The cleaned test pieces were weighed on a Mettler H10 Balance to the closest 0.1 mg. The test pieces in the two series of tests varied in weight from 6.25 g to 6.99 g. After weighing, each test piece was immersed into 60 g of a 3% solution of sodium chloride in water. The solutions were contained in polystyrene vials which were about 50 mm in diameter, 85 mm in height and having polyethylene caps. The solutions were maintained at about 96° F. for three days in a Labline constant temperature water bath.

After this period of time, the condition of each test piece was noted and the test pieces were removed from the salt solution, brushed and washed with water, rinsed with a solvent, dried and weighed. The test pieces of the F13 series lost from 7.7 mg to 9.0 mg of weight due to corrosion, and the test pieces of the G6 series lost from 4.1 mg to 5.1 mg of weight.

The test pieces were next placed in a second test solution. These solutions were duplicate, 60 g weights of 3% solutions of salt, ammonium carbonate, and various ratios of salt and ammonium carbonate, in distilled water.

It should be explained that when ammonium carbamate ($NH_2COONH_2$) is combined with water, a portion of the ammonium carbamate slowly hydrates to so-called commercial ammonium carbonate, which is actually a double salt of ammonium carbamate and ammonium bicarbonate, and ammonia is released:

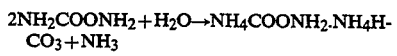

$$2NH_2COONH_2 + H_2O \rightarrow NH_4COONH_2 \cdot NH_4HCO_3 + NH_3$$

The ammonium carbonate used in the EXAMPLES was so-called commercial ammonium carbonate.

The second solutions were maintained at about 96° F. for three more days. After six days, the presence of any corrosion deposits was noted for each piece. The test pieces were then brushed in a water solution, rinsed with solvent, and weighed.

In deciding the appropriate composition of the solutions to be used to determine whether or not ammonium carbonate would inhibit the corrosion process which had already begun, it was decided to add salt to the second solutions so as to approximate the condition in which salt corroded the steel before the ammonium carbonate was added.

The following TABLE 1 illustrates the solution compositions and the test results for the F13 series and the ammonium carbonate portion of the G6 series.

TABLE 1

| | | F13 Series and Ammonium Carbonate Portion of the G6 Series | | | | | |
|---|---|---|---|---|---|---|---|
| | WEIGHT (g) | SECOND SOLUTION INTO WHICH CORRODING TEST PIECE WAS PLACED | | | WEIGHT (g) LOST (−) OR | % OF SALT CORROSION | |
| TEST NO. | LOST IN 3% SALT SOLUTION | % SALT | % AMMONIUM CARBONATE CRYSTALS | % DISTILLED WATER | GAINED (+) IN SECOND SOLUTION | SAVED IN SECOND SOLUTION | REMARKS |
| F13C1 | 0.0083 | 0.0 | 3.0 | 97 | 0.0000 | 100 | NO VISIBLE NEW CORROSION |
| F13C2 | 0.0089 | 0.0 | 3.0 | 97 | 0.0000 | 100 | NO VISIBLE |

TABLE 1-continued

| | | F13 Series and Ammonium Carbonate Portion of the G6 Series | | | | | |
|---|---|---|---|---|---|---|---|
| | WEIGHT (g) LOST IN 3% SALT SOLUTION | SECOND SOLUTION INTO WHICH CORRODING TEST PIECE WAS PLACED | | | WEIGHT (g) LOST (−) OR GAINED (+) IN SECOND SOLUTION | % OF SALT CORROSION SAVED IN SECOND SOLUTION | |
| TEST NO. | | % SALT | % AMMONIUM CARBONATE CRYSTALS | % DISTILLED WATER | | | REMARKS |
| F13C3 | 0.0084 | 0.231 | 2.769 | 97 | 0.0000 | 100 | NO VISIBLE NEW CORROSION |
| F13C4 | 0.0084 | 0.231 | 2.769 | 97 | +0.0001 | 100 | NO VISIBLE NEW CORROSION |
| F13C5 | 0.0087 | 0.69 | 2.31 | 97 | +0.0001 | 100 | NO VISIBLE NEW CORROSION |
| F13C6 | 0.0089 | 0.69 | 2.31 | 97 | 0.0000 | 100 | NO VISIBLE NEW CORROSION |
| F13C7 | 0.0077 | 0.891 | 2.109 | 97 | +0.0001 | 100 | NO VISIBLE NEW CORROSION |
| F13C8 | 0.0088 | 0.891 | 2.109 | 97 | +0.0001 | 100 | NO VISIBLE NEW CORROSION |
| F13C9 | 0.0087 | 1.149 | 1.851 | 97 | 0.0001 | 100 | NO VISIBLE NEW CORROSION |
| F13C10 | 0.0079 | 1.149 | 1.851 | 97 | 0.0000 | 100 | NO VISIBLE NEW CORROSION |
| F13C11 | 0.0088 | 3.0 | 0.0 | 97 | −0.0060 | 0.0 | YELLOW PRECIPITATE FORMED |
| F13C12 | 0.0086 | 3.0 | 0.0 | 97 | −0.0080 | 0 | YELLOW PRECIPITATE FORMED |
| F13C13 | 0.0090 | 0.0 | 0.0 | 100 | −0.0053 | 0 | YELLOW PRECIPITATE FORMED |
| F13C14 | 0.0088 | 0.0 | 0.0 | 100 | −0.0071 | 0 | YELLOW PRECIPITATE FORMED |
| G6C7 | 0.0045 | 1.5 | 1.5 | 97 | −0.0016 | 79 | SLIGHT CORROSION AT TEST PIECE EDGE |
| G6C8 | 0.0045 | 1.5 | 1.5 | 97 | −0.0009 | 88 | SLIGHT CORROSION AT TEST PIECE EDGE |
| G6C9 | 0.0042 | 1.35 | 1.65 | 97 | −0.0003 | 100 | NO VISIBLE NEW CORROSION |
| G6C10 | 0.0050 | 1.35 | 1.65 | 97 | −0.0002 | 100 | NO VISIBLE NEW CORROSION |
| G6C10 | 0.0049 | 1.8 | 1.2 | 97 | −0.0077 | 0 | CORROSION AT TEST PIECE EDGE |
| G6C12 | 0.0046 | 1.8 | 1.2 | 97 | −0.0072 | 0 | CORROSION AT TEST PIECE EDGE |
| G6C13 | 0.0046 | 3.0 | 0.0 | 97 | −0.0076 | 0 | YELLOW PRECIPITATE FORMED |
| G6C14 | 0.0047 | 0.0 | 0.0 | 100 | −0.0081 | 0 | YELLOW PRECIPITATE FORMED |
| G6C15 | 0.0047 | 0.0 | 0.0 | 100 | −0.0075 | 0 | YELLOW PRECIPITATE |

TABLE 1-continued

| | | F13 Series and Ammonium Carbonate Portion of the G6 Series | | | | | |
|---|---|---|---|---|---|---|---|
| | WEIGHT (g) LOST IN 3% SALT | SECOND SOLUTION INTO WHICH CORRODING TEST PIECE WAS PLACED | | | WEIGHT (g) LOST (−) OR GAINED (+) IN SECOND | % OF SALT CORROSION SAVED IN SECOND | |
| TEST NO. | SOLUTION | % SALT | % AMMONIUM CARBONATE CRYSTALS | % DISTILLED WATER | SOLUTION | SOLUTION | REMARKS |
| | | | | | | | FORMED |

The following TABLE 2 illustrates the corrosion inhibiting effects of ammonium carbonate on as-corroded steel previously exposed to sodium chloride for a complete range of solid compositions of ammonium carbonate and sodium chloride added to distilled water.

Based on the results of test numbers G6C7, G6C8, G6C9 and G6C10, ammonium carbonate apparently reaches its limit of ability to inhibit corrosion of ferrous metals at a composition somewhere about 50%–55% ammonium carbonate and 45%–50% salt. At lesser percentages of ammonium carbonate, as in test numbers

TABLE 2

Corrosion Inhibiting Characteristics of Ammonium Carbonate in Compositions of Ammonium Carbonate and Sodium Chloride Based on Percentages of Solids

| | COMPOSITION OF SOLIDS ADDED TO SECOND SOLUTION | | | AVERAGE WEIGHT | |
|---|---|---|---|---|---|
| TEST NOS. | % SALT | % AMMONIUM CARBONATE | % DISTILLED WATER | OF CORROSION (g)[1] | REMARKS |
| F13C1, F13C2 | 0.0 | 100.0 | 97 | 0.0000 | NO VISIBLE NEW CORROSION |
| F13C3, F13C4 | 7.7 | 92.3 | 97 | +0.00005 | NO VISIBLE NEW CORROSION |
| F13C5, F13C6 | 23.0 | 77.0 | 97 | +0.00005 | NO VISIBLE NEW CORROSION |
| F13C7, F13C8 | 29.7 | 70.3 | 97 | +0.0001 | NO VISIBLE NEW CORROSION |
| F13C9, F13C10 | 38.3 | 61.7 | 97 | +0.00005 | NO VISIBLE NEW CORROSION |
| F13C11, F13C12 | 100.00 | 0.0 | 97 | −0.0070 | YELLOW PRECIPITATE PRODUCED |
| F13C13, F13C14 | 0.0 | 0.0 | 100 | −0.0062 | YELLOW PRECIPITATE FORMED |
| G6C7, G6C8 | 50.0 | 50.0 | 97 | −0.00125 | SLIGHT CORROSION ON EDGE OF TEST PIECES |
| C6C9, G6C10 | 45.0 | 55.0 | 97 | −0.00025 | NO VISIBLE NEW CORROSION |
| C6C11, G6C12 | 60.0 | 40.0 | 97 | −0.00745 | CORROSION ON EDGE OF THE TEST PIECES |
| G6C13 | 100.0 | 0.0 | 97 | −0.0076 | YELLOW PRECIPITATE FORMED |
| G6C14, G6C15 | 0.0 | 0.0 | 100 | −0.0078 | YELLOW PRECIPITATE FORMED |

[1]The limit of accuracy of the weight measurement was about ±0.0004 g.

The results reported in TABLE 1 for test numbers F13C11, F13C12 and G6C13 indicate that when steel test pieces which are corroding in a 3% salt solution are placed into a fresh 3% salt solution, they continue to corrode at about the same rate as in the original salt solution. The results from test numbers F13C13, F13C14, G6C14 and G6C15 illustrate that the same results occur when corroding test pieces are placed in 100% distilled water.

In contrast, when corroding test pieces are placed in 3% solutions containing at least 1.5% of ammonium carbonate, as in test numbers F13C1 through F13C10 and G6C7 through G6C10, at least about 80% of the corrosion deposit that had formed in the original 3% salt solution was saved.

G6C11 through G6C15, new corrosion was produced.

EXAMPLE 2

The tests in EXAMPLE 2 were conducted using the same procedure as used in EXAMPLE 1. The test pieces were first caused to corrode in a 3% salt solution. After corroding for three days, the test pieces were removed from the solution, cleaned and weighed. The test pieces were than placed in duplicate, 60 g distilled water weights of 3% solutions of salt, ammonium bicarbonate, and various combinations of salt and ammonium bicarbonate, in distilled water.

The test pieces were maintained for three additional days in the second solutions. The test pieces were then removed and visually inspected, and the presence of any corrosion deposits was noted for each piece. The test pieces were then cleaned, rinsed and weighed.

As in EXAMPLE 1, salt was added to the solutions to determine whether ammonium bicarbonate inhibits the corrosion of steel in the presence of salt. With salt present in the solutions, the conditions in which salt corroded the steel before the ammonium bicarbonate was added were again approximated. The following TABLE 3 illustrates the solution compositions and test results for the ammonium bicarbonate portion of the G6 series.

test pieces which had previously corroded in a 3% salt solution. The results from test numbers G6C1 through G6C4 indicate that when the 3% solution contains more than about 2.4% ammonium bicarbonate as in test numbers G6C5 and G6C6, most further corrosion by sodium chloride is inhibited.

When commercial ammonium carbonate reacts with carbon dioxide and water or carbonic acid, ammonium bicarbonate is produced according to the following equation:

TABLE 3

| | | Ammonium Bicarbonate Portion of the G6C Series | | | | |
|---|---|---|---|---|---|---|
| | WEIGHT (g) LOST IN 3% SALT | SECOND SOLUTION INTO WHICH CORRODING TEST PIECE WAS PLACED | | WEIGHT (g) LOST (−) OR GAINED (+) IN SECOND | PERCENT OF CORROSION | |
| TEST NO. | SOLUTION | % SALT | % AMMONIUM BICARBONATE CRYSTALS | % DISTILLED WATER | SOLUTION[2] | SAVED | REMARKS |
| G6C1 | 0.0049 | 0.27 | 2.73 | 97 | +0.0001 | 100 | NO VISIBLE NEW CORROSION |
| G6C2 | 0.0051 | 0.27 | 2.73 | 97 | −0.0001 | 100 | NO VISIBLE NEW CORROSION |
| G6C3 | 0.0041 | 0.0 | 3.0 | 97 | +0.0001 | 100 | NO VISIBLE NEW CORROSION |
| G6C4 | .0047 | 0.0 | 3.0 | 97 | −0.0001 | 100 | NO VISIBLE NEW CORROSION |
| G6C5 | 0.0051 | 0.531 | 2.469 | 97 | 0.0000 | 100 | VERY SLIGHT CORROSION |
| G6C6 | 0.0045 | 0.531 | 2.469 | 97 | 0.0000 | 100 | VERY SLIGHT CORROSION |
| G6C13 | 0.0046 | 3.0 | 0.0 | 97 | −0.0076 | 0 | YELLOW PRECIPITATE FORMED |
| G6C14 | 0.0047 | 0.0 | 0.0 | 100 | −0.0081 | 0 | YELLOW PRECIPITATE FORMED |
| G6C15 | 0.0047 | 0.0 | 0.0 | 100 | −0.0075 | 0 | YELLOW PRECIPITATE FORMED |

[2]The limit of accuracy of the test measurement was about ±0.0004 g.

The following TABLE 4 illustrates the corrosion inhibiting effects of ammonium bicarbonate with respect to steel previously exposed to sodium chloride for a range of solid compositions of ammonium bicarbonate and sodium chloride added to distilled water.

$$NH_4COONH_2 \cdot NH_4HCO_3 + 2H_2O + CO_2 \rightarrow 3NH_4HCO_3$$

Ammonium bicarbonate is less basic than ammonium carbonate and a less effective inhibitor of corrosion

TABLE 4

| | Corrosion Inhibiting Characteristics of Ammonium Bicarbonate in Compositions of Ammonium Bicarbonate and Sodium Chloride | | | | |
|---|---|---|---|---|---|
| | COMPOSITION OF SOLIDS ADDED TO SECOND SOLUTION | | | | |
| TEST NO. | % SALT | % AMMONIUM BICARBONATE | % DISTILLED WATER | WEIGHT (g) OF CORROSION[3] | REMARKS |
| G6C1, G6C2 | 9.0 | 91.0 | 97 | 0.0000 | NO VISIBLE NEW CORROSION |
| G6C3, G6C4 | 0.0 | 100.0 | 97 | 0.0000 | NO VISIBLE NEW CORROSION |
| G6C5, G6C6 | 17.7 | 82.3 | 97 | 0.0000 | VERY SLIGHT CORROSION ON EDGE OF TEST PIECE |
| G6C13 | 100.0 | 0.0 | 97 | −0.0076 | YELLOW PRECIPITATE FORMED |
| G6C14, G6C15 | 0.0 | 0.0 | 100 | −0.0078 | YELLOW PRECIPITATE FORMED |

[3]The limit of accuracy of the test measurement was about ±0.0004 g.

The data for test numbers G6C13, G6C14 and G6C15 demonstrate that, as in EXAMPLE 1, 100% distilled water or a 3% salt solution continues to corrode steel produced by sodium chloride. Based on the data reported in TABLE 4, a composition of about 82% ammonium bicarbonate and 18% sodium chloride contains the minimum amount of ammonium bicarbonate which inhibits chloride corrosion. Some new corrosion was observed for test numbers G6C5 and G6C6 having this composition. Test numbers G6C1, G6C2, G6C3 and G6C4 contained higher percentages of ammonium bicarbonate and no new corrosion was observed for these test pieces.

In view of the finding that ammonium carbonate and ammonium bicarbamate inhibit the corrosion of the ferrous metal exposed to even a high percentage of sodium chloride, these chemicals have great potential as reagents for applying to steel to inhibit corrosion by chlorides such as sodium chloride.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A method of inhibiting the corrosion of a metal by a corrosive agent, comprising applying to the metal a composition comprising an effective amount of an active component selected from the group consisting of ammonium carbonate and ammonium bicarbonate to inhibit corrosion of the metal by the corrosive agent.

2. The method of claim 1, wherein said composition further comprises water, said active component is ammonium carbonate, said metal is a ferrous based metal and said corrosive agent is sodium chloride, and the ratio by weight of said ammonium carbonate to said sodium chloride is greater than about 1.

3. The method of claim 1, wherein said composition further comprises water, said active component is ammonium bicarbonate, said metal is a ferrous based metal and said corrosive agent is sodium chloride, and the ratio by weight of said ammonium bicarbonate to said sodium chloride is greater than about 4.

4. The method of claim 1, wherein said composition further comprises a liquid carrier.

5. The method of claim 4, wherein said liquid carrier is water.

6. The method of claim 1, wherein said ammonium carbonate has a molecular formula of $NH_4COONH_2 \cdot HN_4HCO_3$.

7. The method of claim 1, wherein said metal is a ferrous-based metal.

8. The method of claim 7, wherein said corrosive agent is a chloride.

9. The method of claim 8, wherein said chloride is sodium chloride.

* * * * *